United States Patent
Hu

(10) Patent No.: US 8,196,493 B2
(45) Date of Patent: *Jun. 12, 2012

(54) METHODS FOR MANUFACTURING COMBINATION WRENCHES WITHOUT GENERATING CARBON SCALE

(76) Inventor: Bobby Hu, Taichung (TW)

( * ) Notice: Subject to any disclaimer, the term of this patent is extended or adjusted under 35 U.S.C. 154(b) by 453 days.

This patent is subject to a terminal disclaimer.

(21) Appl. No.: 12/512,092

(22) Filed: Jul. 30, 2009

(65) Prior Publication Data

US 2010/0043518 A1 Feb. 25, 2010

(30) Foreign Application Priority Data

Aug. 20, 2008 (TW) ................. 97131820 A

(51) Int. Cl.
- *B21K 5/16* (2006.01)
- *B23P 15/00* (2006.01)
- *B25B 13/04* (2006.01)

(52) U.S. Cl. ............ 76/114; 76/101.1; 72/339

(58) Field of Classification Search .......... 76/101.1, 76/114; 72/339, 341, 356

See application file for complete search history.

(56) References Cited

U.S. PATENT DOCUMENTS

| | | | | |
|---|---|---|---|---|
| 1,296,373 | A | * | 3/1919 | Dow ............................ 428/609 |
| 1,564,167 | A | * | 12/1925 | Witherow ..................... 76/114 |
| 2,720,799 | A | * | 10/1955 | Pfost ............................. 164/111 |
| 4,061,507 | A | * | 12/1977 | Allmendinger .............. 148/610 |
| 7,503,242 | B2 | * | 3/2009 | Hu ................................. 76/114 |
| 2004/0089104 | A1 | * | 5/2004 | Hsien ........................... 76/114 |
| 2010/0043518 | A1 | * | 2/2010 | Hu ................................. 72/339 |
| 2010/0043601 | A1 | * | 2/2010 | Hu ................................. 76/114 |

FOREIGN PATENT DOCUMENTS

| | | | | |
|---|---|---|---|---|
| EP | 2 156 920 | * | 2/2010 | |
| FR | 2 831 473 | * | 5/2003 | |
| JP | 57-39055 | * | 3/1982 | |
| WO | WO 2005/011893 | * | 2/2005 | |

* cited by examiner

Primary Examiner — Hwei C Payer
(74) Attorney, Agent, or Firm — Alan Kamrath; Kamrath IP Lawfirm, PA

(57) ABSTRACT

A method for manufacturing a combination wrench includes pressing a wrench material piece in a sealed mold at a temperature without generating carbon scale to form a semifinished product including first and second driving ends and a handle interconnected between the first and second driving ends. The first and second driving ends of the wrench semifinished product are processed to form a combination wrench having a box end and an open end. The wrench material piece can be obtained by shearing a material plate.

20 Claims, 13 Drawing Sheets

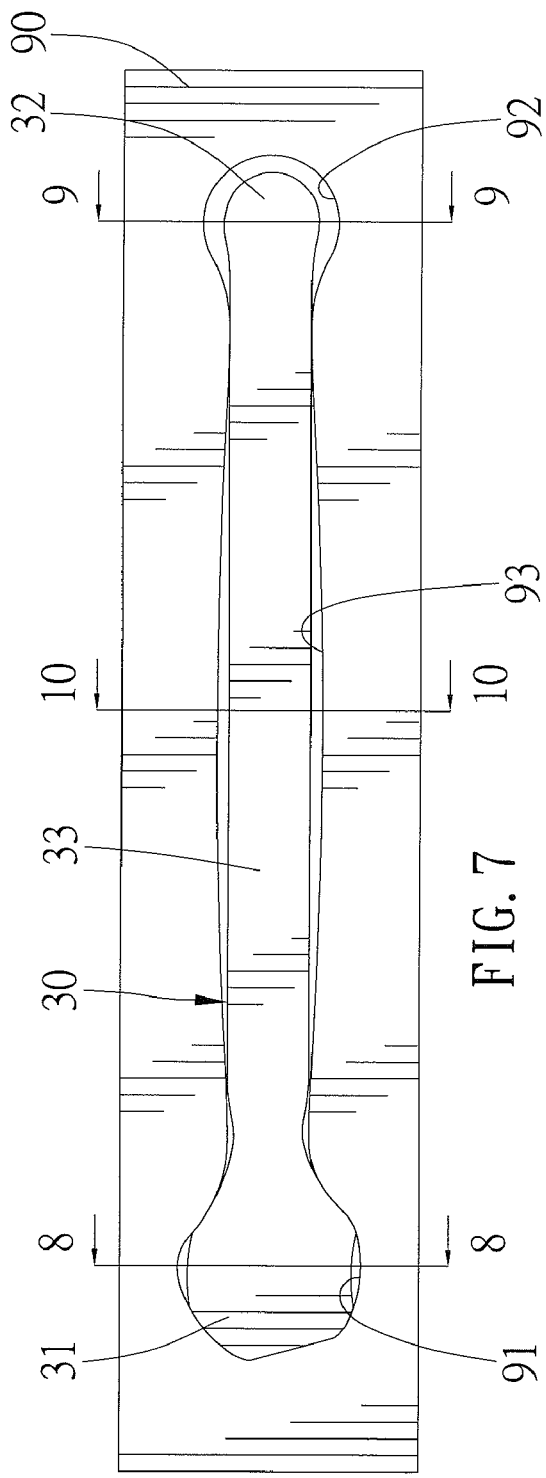
FIG. 7
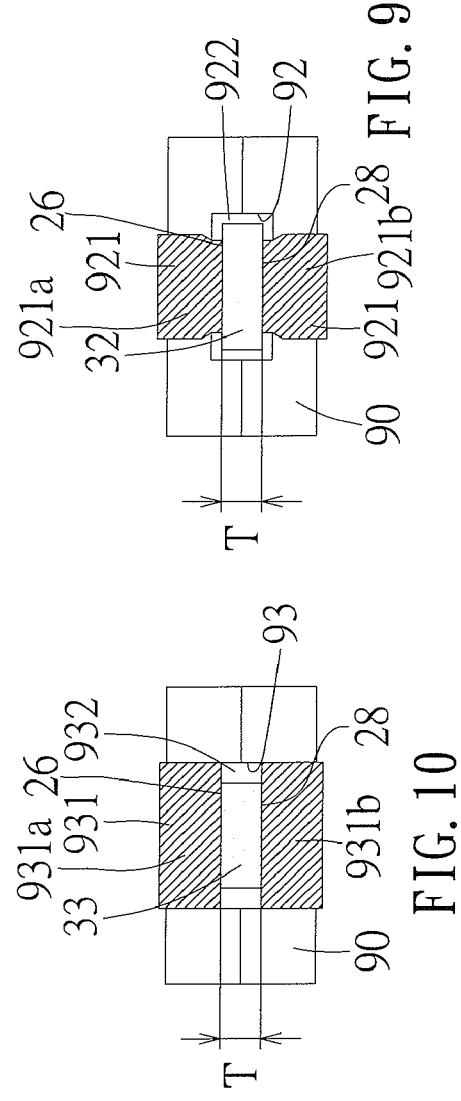
FIG. 9
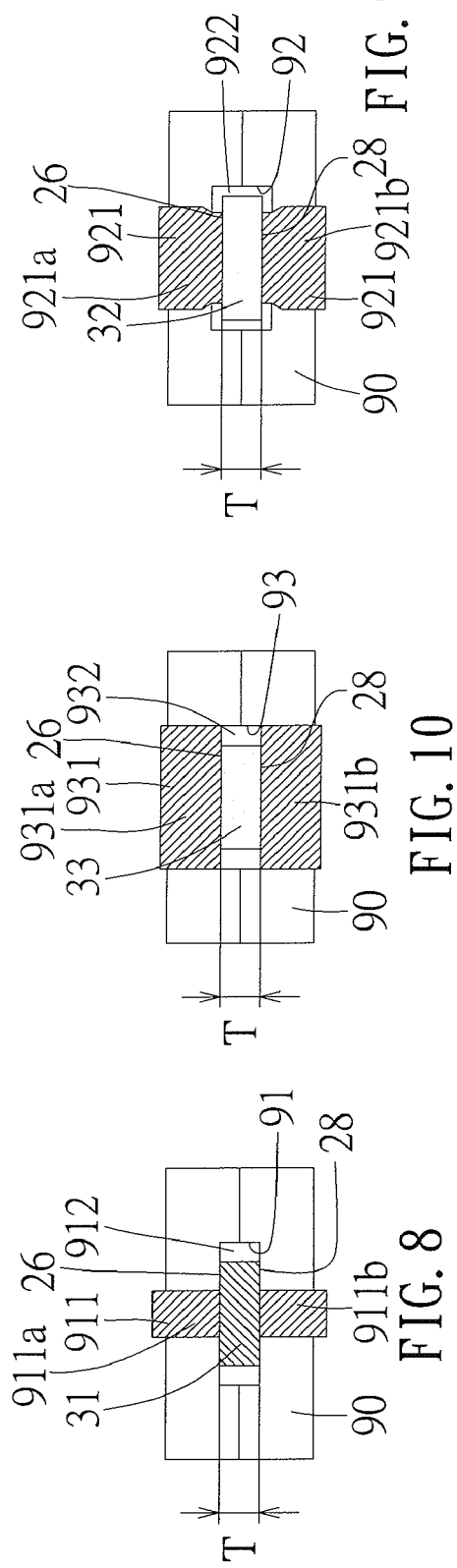
FIG. 10
FIG. 8

METHODS FOR MANUFACTURING COMBINATION WRENCHES WITHOUT GENERATING CARBON SCALE

BACKGROUND OF THE INVENTION

The present invention relates to methods for manufacturing combination wrenches and, more particularly, to methods for manufacturing combination wrenches without generating carbon scale.

FIGS. 18 and 18A show a cylindrical bar 1 for manufacturing a combination wrench according to a conventional method. Specifically, bar 1 of a predetermined length is prepared by cutting. Bar 1 is heated to a temperature above 800° C. to soften for hot-forging. Upper and lower dies are then utilized to forge the softened bar 1 into a wrench blank 2 shown in FIG. 19. Since wrench blank 2 is still at a high temperature, waiting for the wrench blank 2 to cool down for subsequent processing is a waste section 3 and adversely affects the speed of manufacturing. Furthermore, layers of carbon scale are generated when the temperature of wrench blank 2 lowers to room temperature, and manual grinding for removing the carbon scale is required, leading to an increase in the manufacturing costs. Further, a considerable waste section 3 up to 50% of bar 1 is generated during forging of wrench blank 2, increasing the material costs. Further, it is difficult to control the thickness of waste section 3, such that the tolerance of wrench blank 2 is relatively high, reducing yield. Further, removal of the waste section 3 is not easy when clamping waste section 3 formed around wrench blank 2. Laborsome and time-consuming manual removal of waste section 3 by grinding is, thus, required.

Thus, a need exists for novel methods for manufacturing combination wrenches with less waste section of materials to avoid laborsome and time-consuming removal of the waste.

BRIEF SUMMARY OF THE INVENTION

The present invention solves this need and other problems in the field of manufacturing of combination wrenches by providing, in a preferred aspect, a method including preparing a wrench material piece having first and second ends spaced in a first, width direction and an interconnecting section interconnected between the first and second ends. The interconnecting section includes first and second sides spaced in a second, length direction perpendicular to the width direction. The wrench material piece has a thickness in a third, thickness direction perpendicular to the width and length directions. The wrench material piece is pressed in a sealed mold at a temperature without generating carbon scale to form a wrench semifinished product having first and second driving ends formed from the first and second ends of the wrench material piece. The wrench semifinished product further includes a handle interconnected between the first and second driving ends and formed from the interconnecting section of the wrench material piece. The wrench semifinished product further includes upper and lower surfaces extending between the first and second driving ends spaced in the thickness direction. The first driving end of the wrench semifinished product has a height between the upper and lower surfaces and not larger than the thickness of the wrench material piece. The second driving end of the wrench semifinished product has a height between the upper and lower surfaces and larger than the thickness of the wrench material piece. The handle of the wrench semifinished product has a first height between the upper and lower surfaces adjacent the first driving end. The handle of the wrench semifinished product further has a second height between the upper and lower surfaces adjacent the second driving end. The first height is smaller than the height of the first driving end, and the second height is smaller than the height of the second driving end. The first and second driving ends of the wrench semifinished product are processed to form a combination wrench having two ends with different shapes.

In a preferred aspect, waste sections of each of the first and second ends of the wrench material piece can be removed before pressing the wrench material piece to form the wrench semifinished product.

In another preferred aspect, the first and second driving ends of the wrench semifinished product are pressed to form a box end and an open end, respectively. The first end of the wrench material piece is placed in a first mold part of the sealed mold and then pressed in the thickness direction to form the first driving end of the semifinished product. The first mold part defines a first cavity having a first contour complimentary to the open end of the combination wrench. The first end of the wrench material piece has a volume smaller than that of the first mold part, leaving a first space in the first mold part before pressing. After pressing, the first driving end of the wrench semifinished product does not protrude beyond and completely fills the first mold part without leaving any space in the first mold part. Furthermore, the second end of the wrench material piece is placed in a second mold part of the sealed mold and then pressed in the thickness direction to form the second driving end of the wrench semifinished product. The second mold part defines a second cavity having a second contour complimentary to the box end of the combination wrench. The second end of the wrench material piece has a volume smaller than that of the second mold part, leaving a second space in the second mold part before pressing. After pressing, the second driving end of the semifinished product does not protrude beyond and completely fills the second mold part without leaving any space in the second mold part. Furthermore, the interconnecting section of the wrench material piece is placed in a third mold part of the sealed mold and then pressed in the thickness direction to form the handle of the wrench semifinished product. The third mold part is interconnected between the first and second mold parts and defines a third cavity having a third contour complimentary to the handle of the combination wrench. The interconnecting section of the wrench material piece has a volume smaller than that of the third mold part, leaving a third space in the third mold part before pressing. After pressing, the handle of the wrench semifinished product does not protrude beyond and completely fills the third mold part without leaving any space in the third mold part.

The wrench material piece can be obtained by shearing a material plate.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 7 shows a schematic top view of the wrench material piece of FIG. 5 received in a mold cavity of the sealed mold of FIG. 6.

FIG. 8 shows a cross sectional view of the wrench material piece and the sealed mold of FIG. 7 according to section line 8-8 of FIG. 7.

FIG. 9 shows a cross sectional view of the wrench material piece and the sealed mold of FIG. 7 according to section line 9-9 of FIG. 7.

FIG. 10 shows a cross sectional view of the wrench material piece and the sealed mold of FIG. 7 according to section line 10-10 of FIG. 7.

Figure 1:
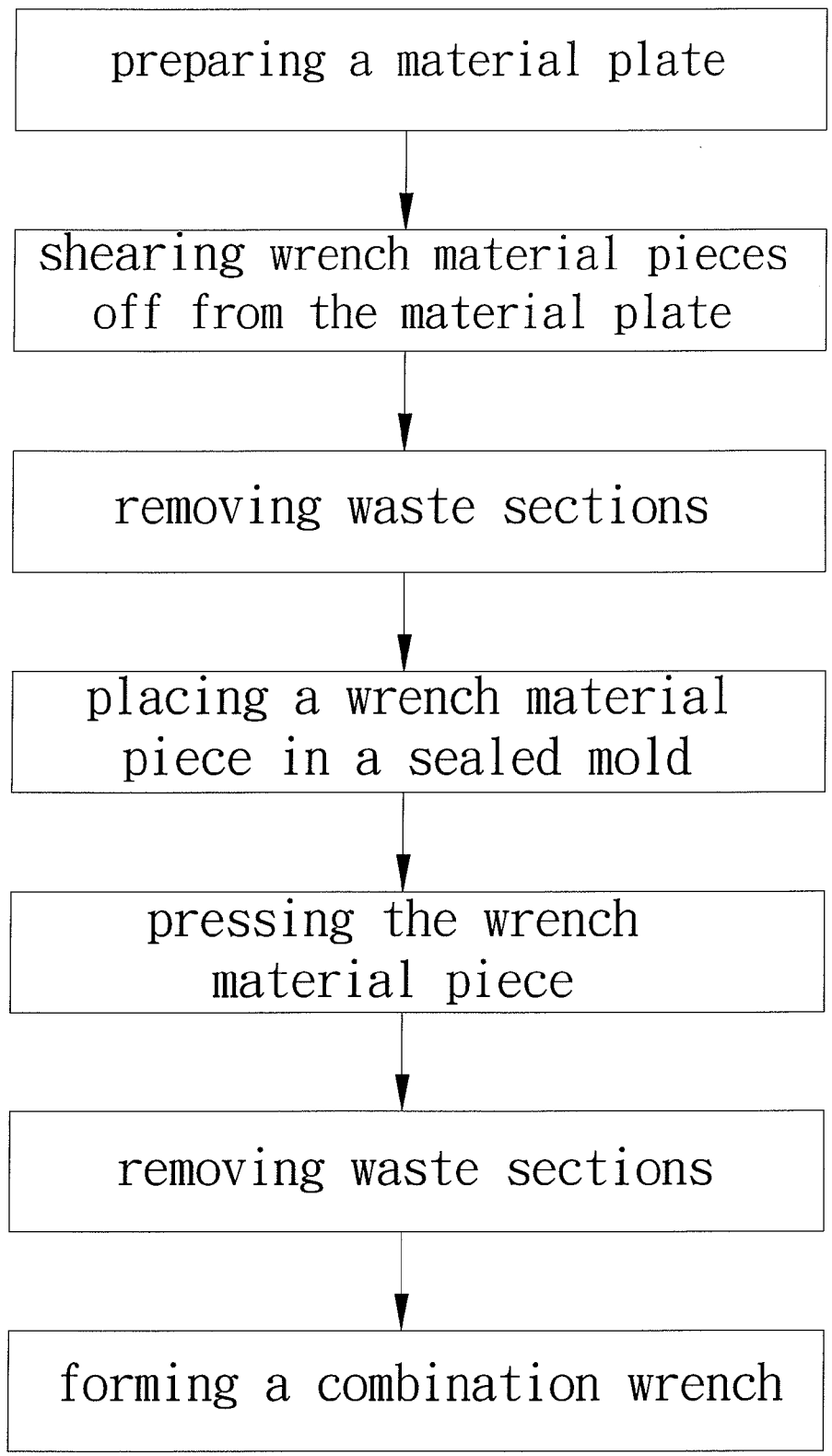
FIG. 1 shows a flowchart illustrating a method for manufacturing combination wrenches according to the preferred teachings of the present invention.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "fourth" "fifth", "sixth", "lower", "upper", "outer", "side", "end", "portion", "part", "section", "thickness", "length", "width", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
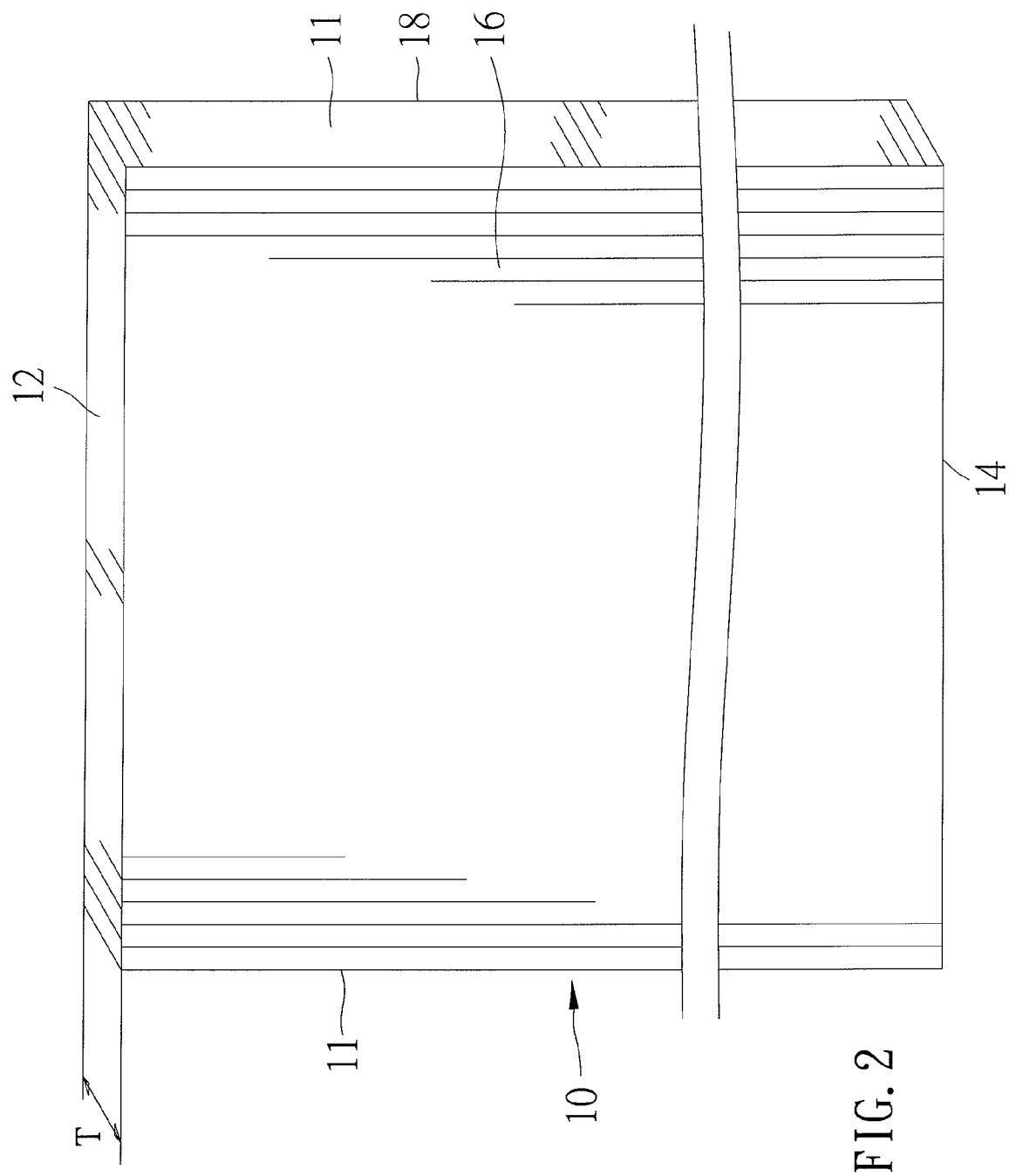
FIG. 2 shows a perspective view of a material plate for manufacturing combination wrenches.
Figure 17:
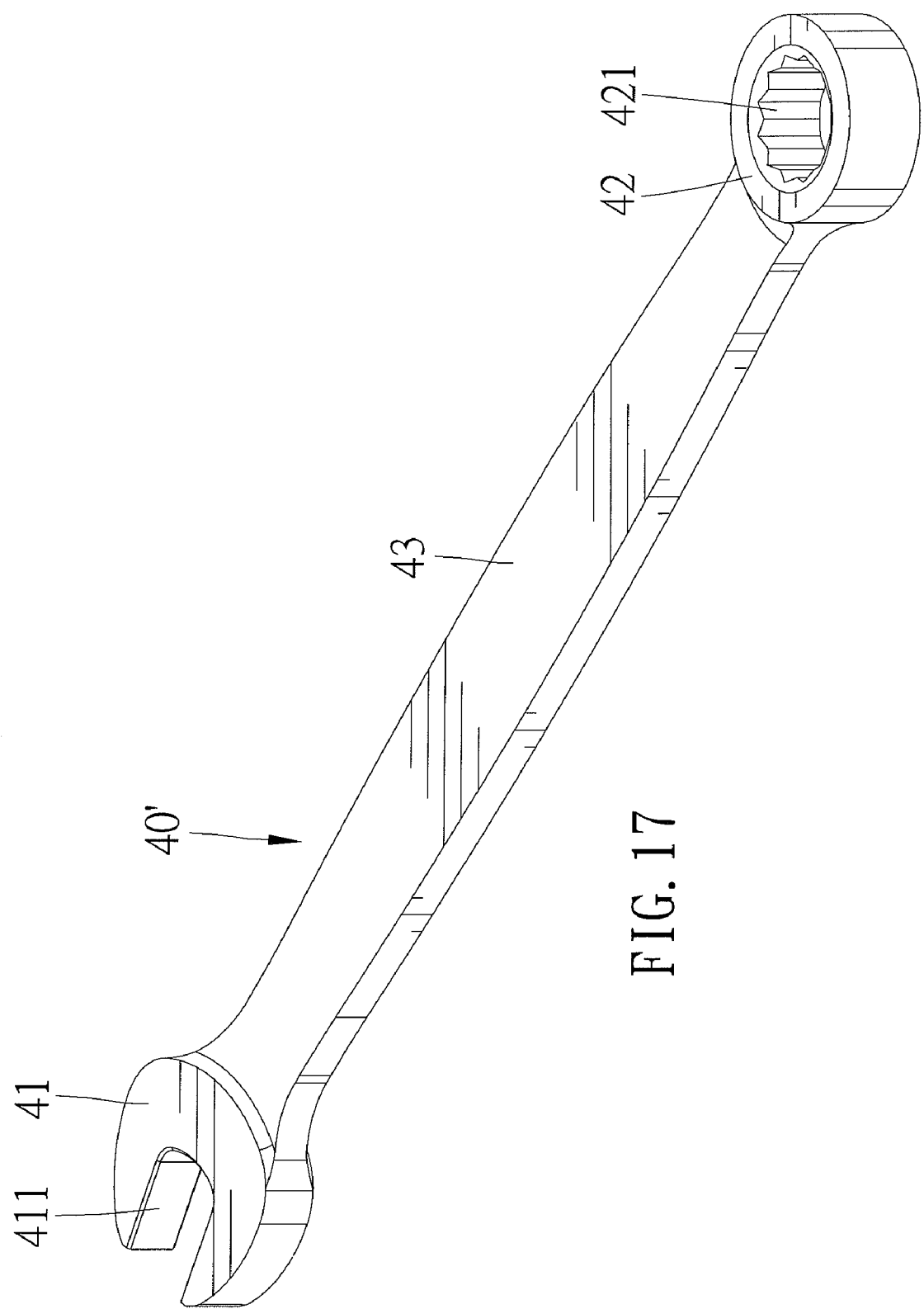
FIG. 17 shows a perspective view of a combination wrench after removing waste sections from the wrench semifinished product of FIG. 16.
Figure 18A:
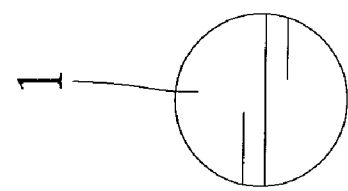
FIG. 18A shows an end view of the cylindrical bar of FIG. 18.
Figure 18:
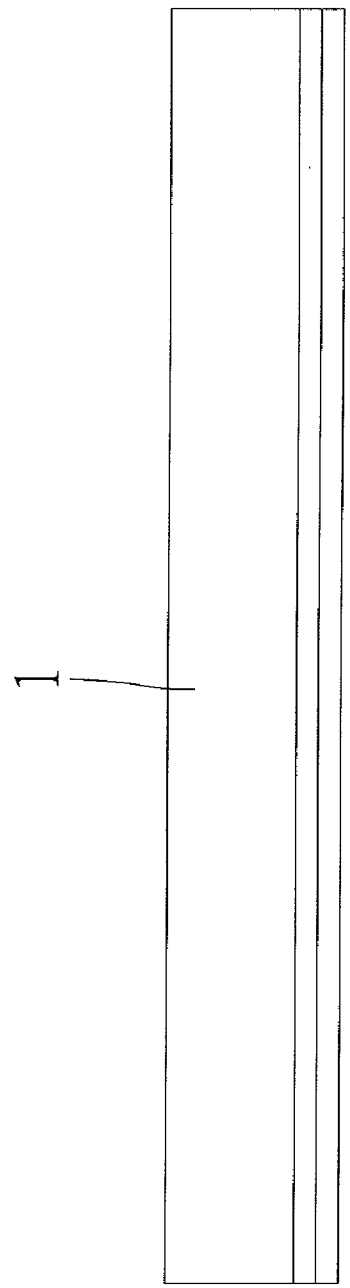
FIG. 18 shows an elevational view of a cylindrical bar for manufacturing a combination wrench according to a conventional method.
Figure 19:
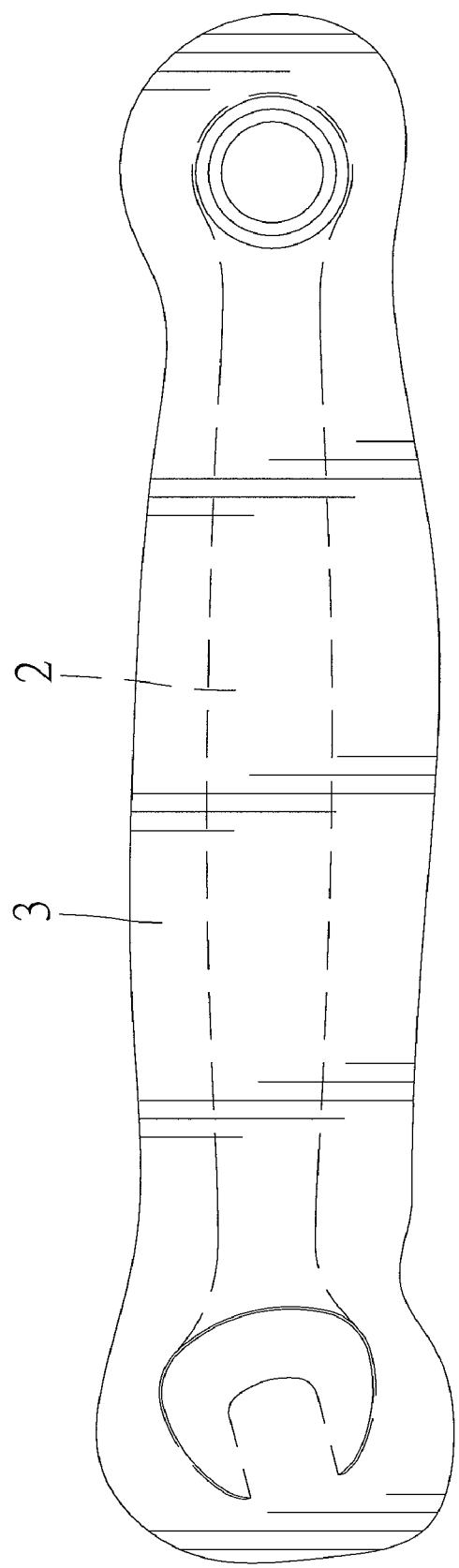
FIG. 19 shows a wrench blank obtained from the cylindrical bar in FIG. 18 according to the conventional method.

FIG. 1 shows a flowchart illustrating a method according to the preferred teachings of the present invention for manufacturing a plurality of combination wrenches 40' from a material plate 10 (FIG. 2). Each combination wrench 40' includes a first driving end 41, a second driving end 42, and a handle 43 interconnected between first and second driving ends 41 and 42. In the preferred form shown in FIG. 17, first driving end 41 is an open end including an engaging opening 411 for driving a fastener such as a bolt head, a nut or the like, and second driving end 42 is a box end including an engaging hole 421 for driving a fastener such as a bolt head, a nut or the like.

According to the preferred teachings of the present invention, material plate 10 is prepared and includes first and second edges 11 spaced in a width direction and top and bottom edges 12 and 14 extending between first and second edges 11 and spaced in a length direction perpendicular to the width direction. Material plate 10 further includes upper and lower faces 16 and 18 extending between top and bottom edges 12 and 14 and between first and second edges 11. Upper and lower faces 16 and 18 define a thickness T therebetween in a thickness direction perpendicular to the width and length directions.

Figure 3:
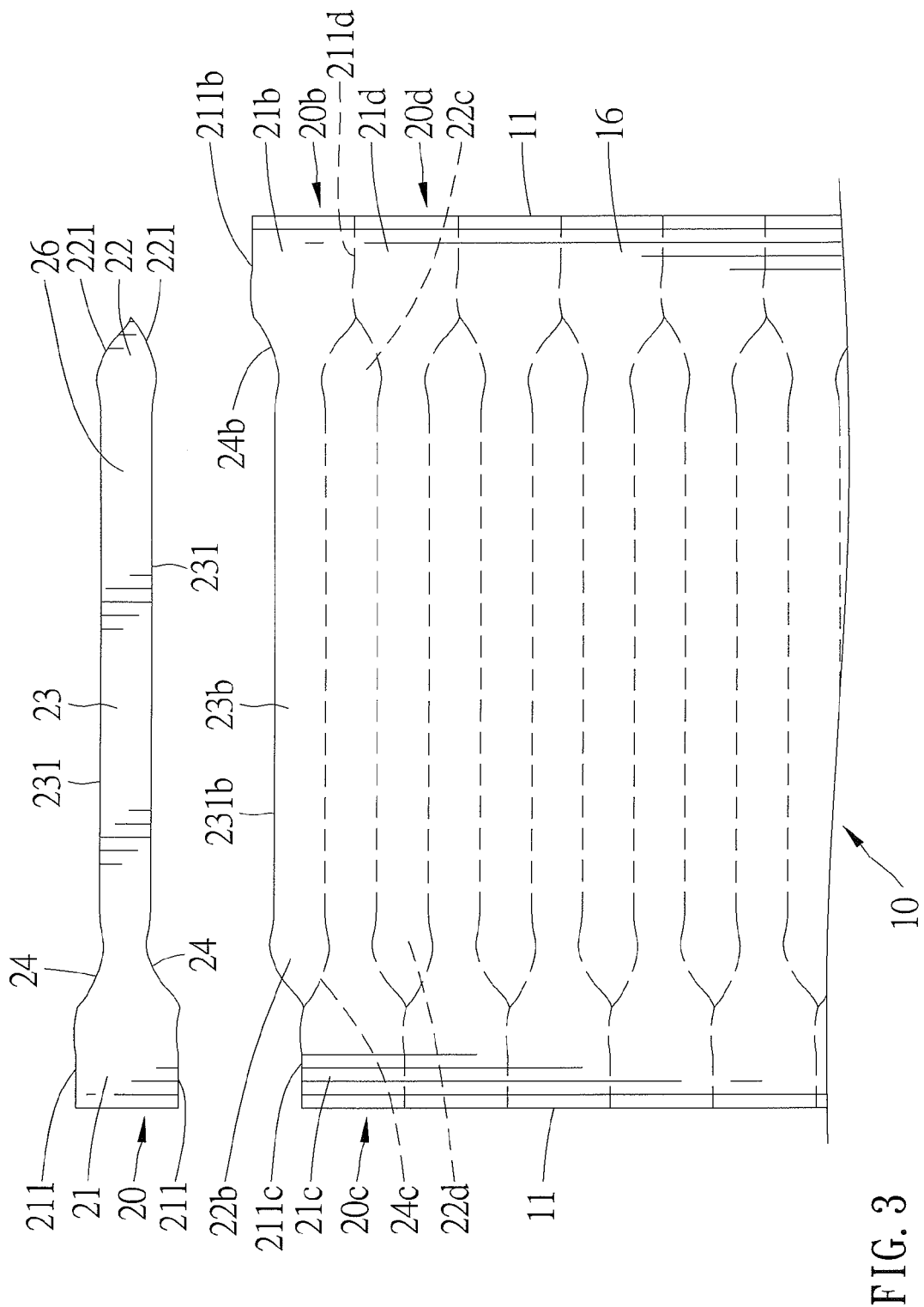
FIG. 3 shows a schematic side view of the material plate with a wrench material piece sheared from the material plate of FIG. 2.

Referring to FIG. 3, material plate 10 includes a plurality of wrench material pieces 20, 20b, 20c, and 20d arranged in the length direction. Each wrench material piece 20, 20b, 20c, 20d includes first and second ends 21 and 22, 21b and 22b, 21c and 22c, 21d and 22d spaced in the width direction and an interconnecting section 23, 23b interconnected between first and second ends 21 and 22, 21b and 22b, 21c and 22c, 21d and 22d. Each of even-numbered wrench material pieces 20b and 20d spaced in the length direction is intermediate two adjacent odd-numbered wrench material pieces 20 and 20c spaced in the length direction. First end 21, 21c of each odd-numbered wrench material piece 20, 20c is located on first edge 11 of material plate 10. First end 21b, 21d of each even-numbered wrench material piece 20b, 20d is located on second edge 11 of material plate 10. Interconnecting section 23, 23b of each wrench material piece 20, 20b, 20c, 20d includes first and second longer sides 231, 231b spaced in the length direction. First end 21, 21b, 21c, 21d of each wrench material piece 20, 20b, 20c, 20d includes first and second shorter sides 211, 211b, 211c, 211d spaced in the length direction. Second end 22, 22b, 22c, 22d of each wrench material piece 20, 20b, 20c, 20d includes first and second inclined sides 221 spaced in the length direction. Each wrench material piece 20, 20b, 20c, 20d further includes first and second interconnecting inclined sides 24, 24b, 24c spaced in the length direction. First longer side 231, 231b of each wrench material piece 20, 20b, 20c, 20d is intermediate first interconnecting inclined side 24, 24b, 24c and first inclined side 221 of wrench material piece 20, 20b, 20c, 20d. Second longer side 231, 231b of each wrench material piece 20, 20b, 20c, 20d is intermediate second interconnecting inclined side 24, 24b, 24c and second inclined side 221 of wrench material piece 20, 20b, 20c, 20d. Second longer side 231, 231b of each wrench material piece 20, 20b, 20c is coincident to first longer side 231b of an adjacent wrench material piece 20b, 20c, 20d. Second shorter side 211 of each odd-numbered wrench material piece 20 is coincident to first shorter side 211c of an adjacent odd-numbered wrench material piece 20c. Second shorter side 211b of each even-numbered wrench material piece 20b is coincident to first shorter side 211d of an adjacent even-numbered wrench material piece 20d. Second interconnecting inclined side 24, 24b, 24c of each wrench material piece 20, 20b, 20c is coincident to first inclined side 221 of an adjacent wrench material piece 20b, 20c, 20d. Second inclined side 221 of each wrench material piece 20, 20b, 20c is coincident to first interconnecting inclined side 24b, 24c of an adjacent wrench material piece 20b, 20c, 20d.

Figure 4:
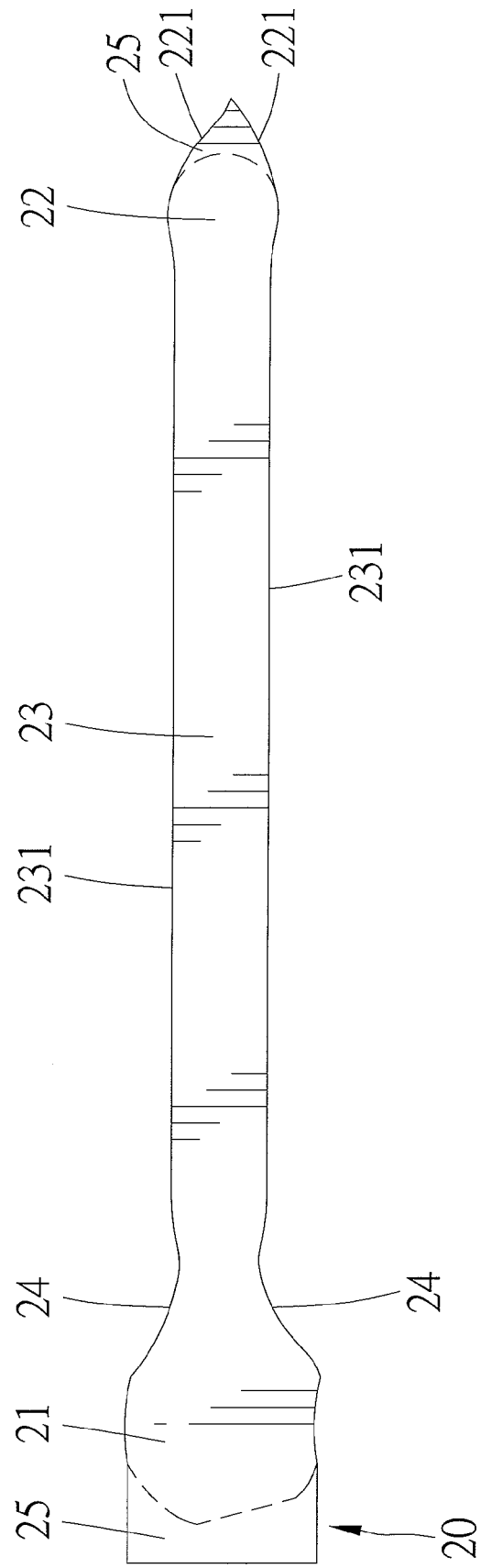
FIG. 4 shows a side view of the wrench material piece of FIG. 3.
Figure 5:
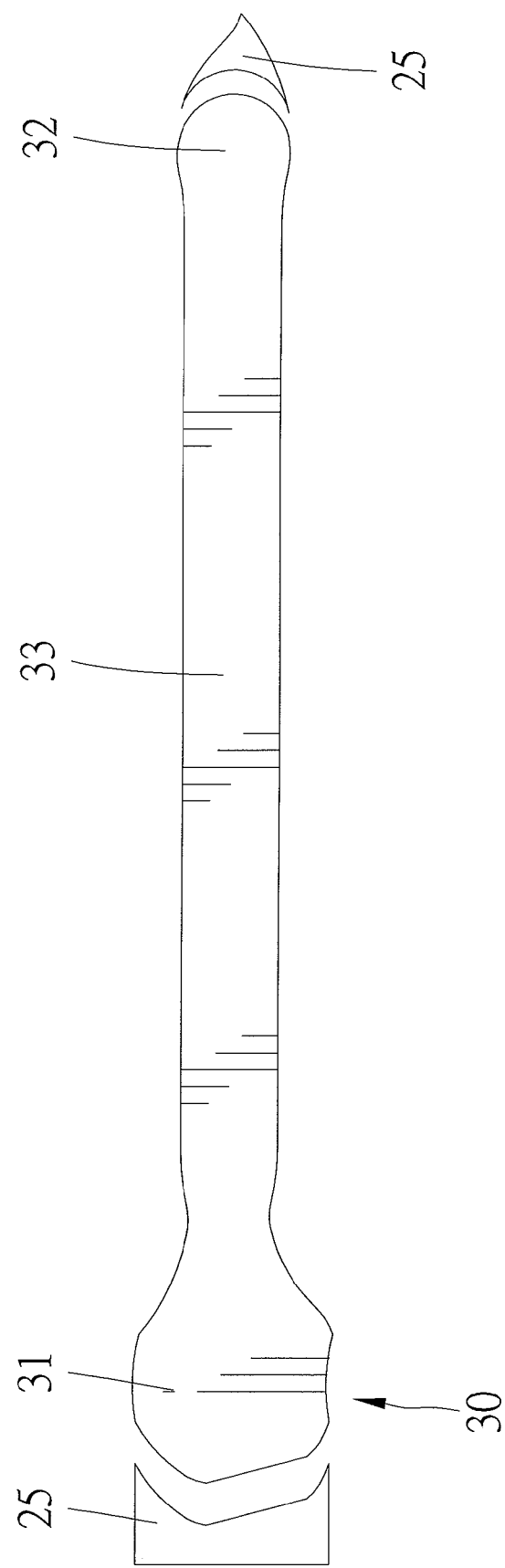
FIG. 5 shows a side view illustrating removal of a waste section from each of two ends of the wrench material piece of FIG. 4.

Each wrench material piece 20, 20b, 20c, 20d is sheared from material plate 10 such as by a shearing die. Next, waste sections 25 on first and second ends 21 and 22, 21b and 22b, 21c and 22c, 21d and 22d of each wrench material piece 20, 20b, 20c, 20d are removed to form a wrench blank 30 (see FIGS. 4 and 5). Wrench blank 30 includes first and second ends 31 and 32 spaced in the width direction and an interconnecting section 33 interconnected between first and second ends 31 and 32. Wrench blank 30 further includes first and second faces 26 and 28 spaced in the thickness direction (see FIG. 8) and formed from a portion of upper face 16 and a portion of lower face 18 of material plate 10.

Figure 6:
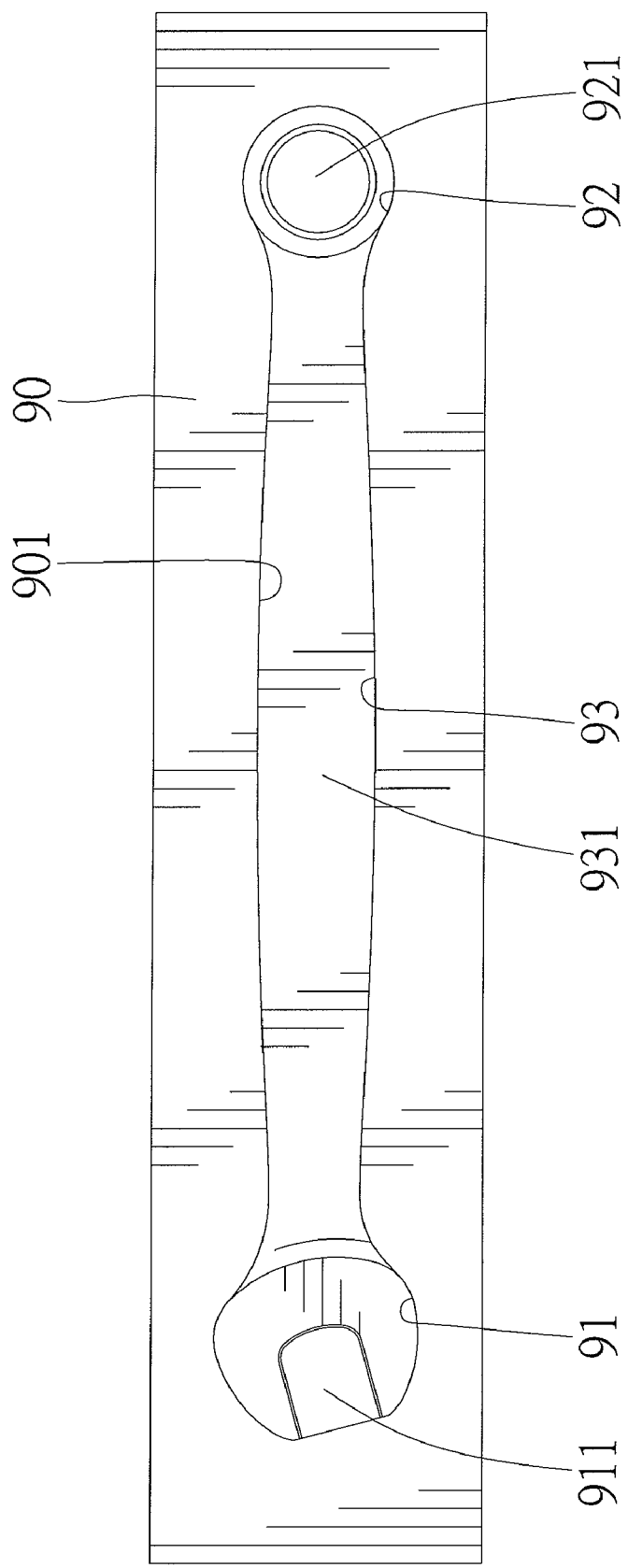
FIG. 6 shows a schematic top view of a sealed mold.
Figure 11:
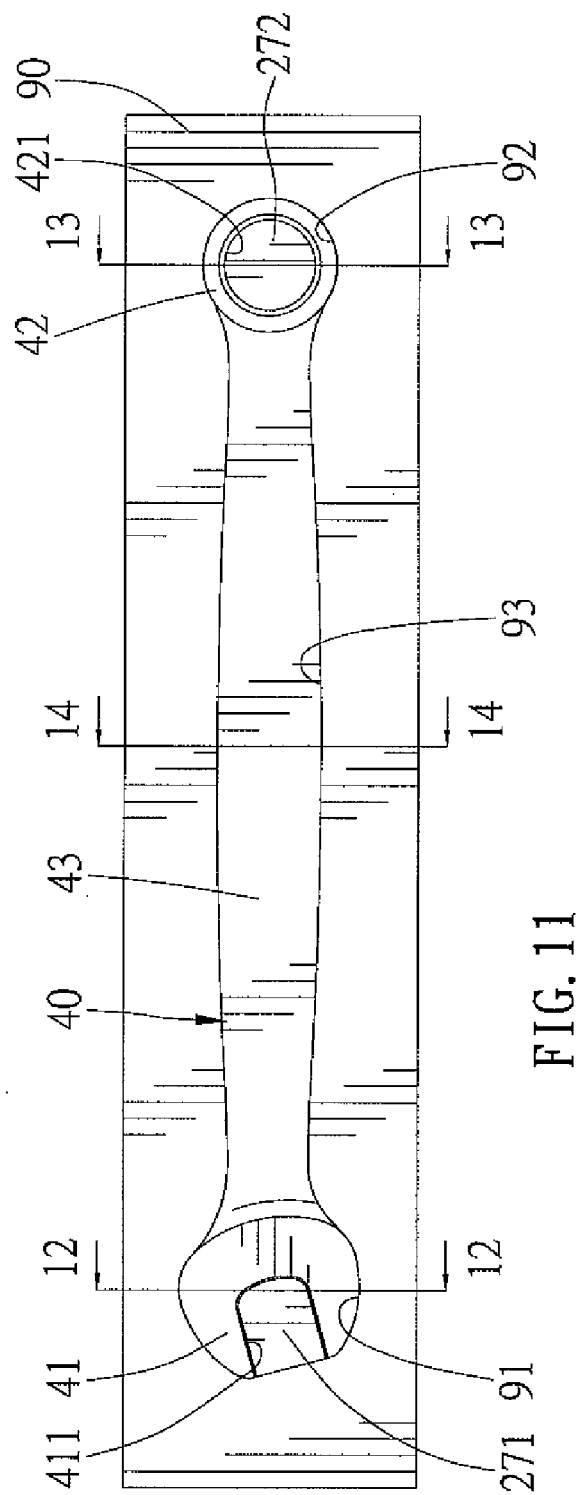
FIG. 11 shows a schematic top view of the sealed mold and a wrench semifinished product after pressing the wrench material piece of FIG. 7 in the sealed mold.
Figure 13:
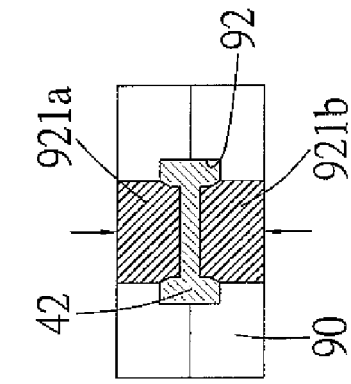
FIG. 13 shows a cross sectional view of a second driving end of the wrench semifinished product and the sealed mold of FIG. 11 according to section line 13-13 of FIG. 11.
Figure 14:
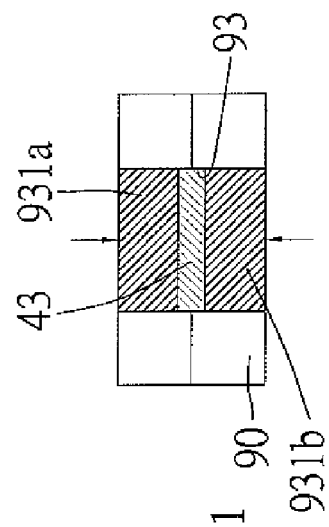
FIG. 14 shows a cross sectional view of a handle of the wrench semifinished product and the sealed mold of FIG. 11 according to section line 14-14 of FIG. 11.
Figure 12:
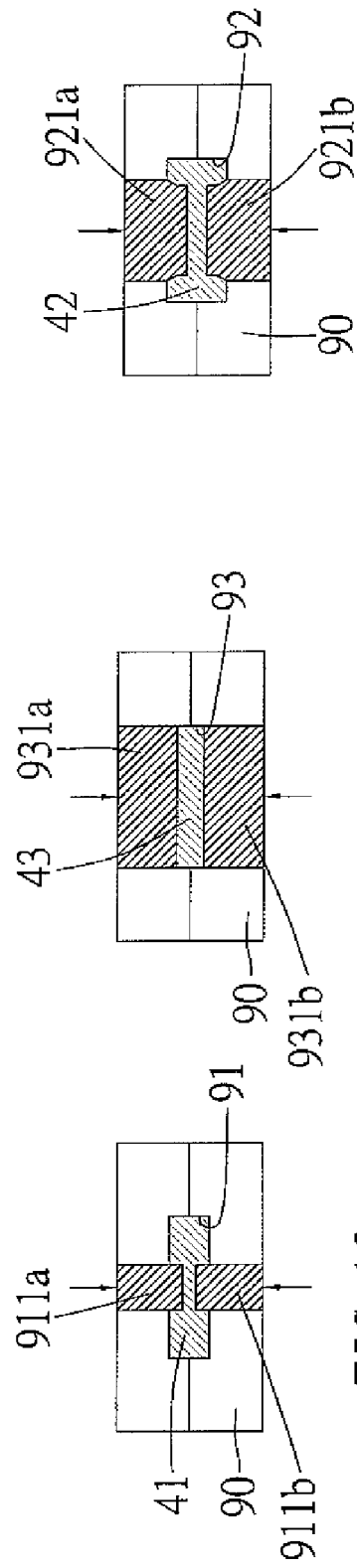
FIG. 12 shows a cross sectional view of a first driving end of the wrench semifinished product and the sealed mold of FIG. 11 according to section line 12-12 of FIG. 11.

Then, each wrench blank 30 is placed in a sealed mold 90 having a mold cavity 901 (FIG. 6). Mold cavity 901 includes first, second and third mold parts 91, 92 and 93. Referring to FIGS. 7-10, first mold part 91 defines a first cavity having a first contour complimentary to first driving end 41 of combination wrench 40' and having a volume greater than that of first end 31 of wrench blank 30, leaving a first space 912 in first mold part 91 when first end 31 of wrench blank 30 is received in first mold part 91. Second mold part 92 defines a second cavity having a second contour complimentary to second driving end 42 of combination wrench 40' and having a volume greater than that of second end 32 of wrench blank 30, leaving a second space 922 in second mold part 92 when second end 32 of wrench blank 30 is received in second mold part 92. Third mold part 93 defines a third cavity having a third contour complimentary to handle 43 of combination wrench 40' and having a volume greater than that of interconnecting section 33 of wrench blank 30, leaving a third space 932 in third mold part 93 when interconnecting section 33 of wrench blank 30 is received in third mold part 93.

Next, each wrench blank 30 is pressed in sealed mold 90 to form a wrench semifinished product 40. Referring to FIGS. 11-14, in the pressing process, first end 31, second end 32, and interconnecting section 33 of wrench blank 30 in sealed mold 90 are simultaneously and respectively squeezed by first, second, and third dies 911, 921 and 931 to form first and second driving ends 41 and 42 and handle 43 of wrench semifinished product 40. First die 911 includes first and second die parts 911a and 911b, second die 921 includes third and fourth die parts 921a and 921b, and third die 931 includes fifth and sixth die parts 931a and 931b. The pressing process is carried out at a temperature without generating carbon scale so that carbon scale will not be generated on a surface of wrench semifinished product 40. Wrench blank 30 in sealed mold 90 can be pressed at room temperature by cold-forging. In another approach, wrench blank 30 in sealed mold 90 is heated and then pressed at a temperature below a recrystallization temperature thereof.

Figure 15:
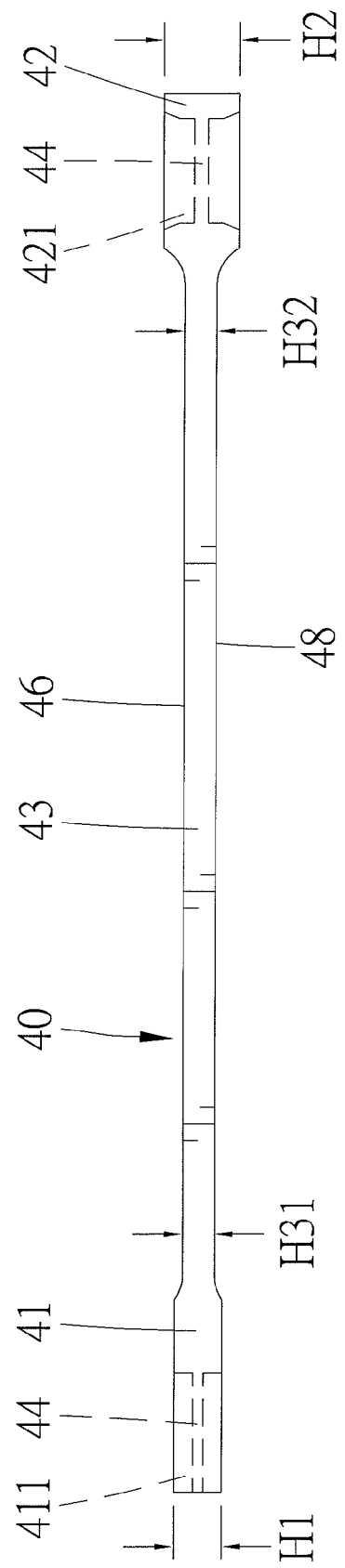
FIG. 15 shows a side view of the wrench semifinished product of FIG. 11.
Figure 16:
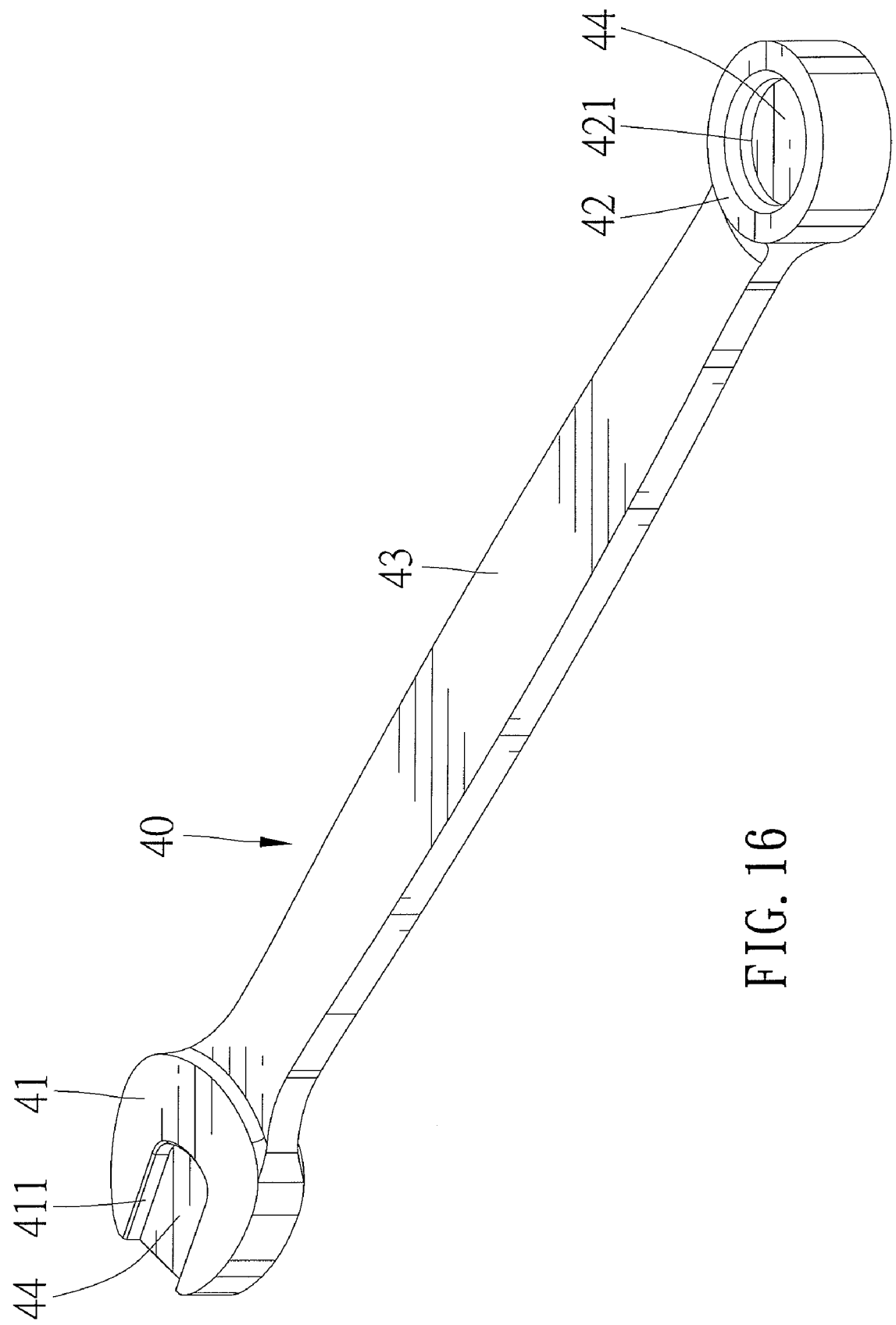
FIG. 16 shows a perspective view of the wrench semifinished product of FIG. 15.

During pressing second end 32 of wrench blank 30 to form second driving end 42 of wrench semifinished product 40, first and second faces 26 and 28 at a second intermediate portion 272 of second end 32 of wrench blank 30 are sandwiched and respectively squeezed in the thickness direction by third and fourth die parts 921a and 921b of second die 921 to reduce a thickness of second intermediate portion 272 to be smaller than thickness T of material plate 10. Second intermediate portion 272 of second end 32 of wrench blank 30 is spaced from an outer periphery of second driving end 42 of wrench semifinished product 40. After pressing, second driving end 42 of the semifinished product 40 does not protrude out of and completely fills second mold part 92 without leaving any space in second mold part 92. As shown in FIG. 15, second driving end 42 of wrench semifinished product 40 has a height H2 between upper and lower surfaces 46 and 48 and larger than thickness T.

During pressing interconnecting section 33 of wrench blank 30 to form handle 43 of wrench semifinished product 40, first and second faces 26 and 28 at interconnecting section 33 of wrench blank 30 are sandwiched and respectively squeezed in the thickness direction by fifth and sixth die parts 931a and 931b of third die 931 to reduce a thickness of interconnecting section 33 to be smaller than thickness T. After pressing, handle 43 of wrench semifinished product 40 does not protrude out of and completely fills third mold part 93 without leaving any space in third mold part 93. Handle 43 of wrench semifinished product 40 has a first height H31 between upper and lower surfaces 46 and 48 adjacent first driving end 41 and a second height H32 between upper and lower surfaces 46 and 48 adjacent second driving end 42. First height H31 is smaller than height H1 of first driving end 41, and second height H32 is smaller than height H2 of second driving end 42.

During pressing interconnecting section 33 of wrench blank 30 to form handle 43 of wrench semifinished product 40, first and second faces 26 and 28 at interconnecting section 33 of wrench blank 30 are sandwiched and respectively squeezed in the thickness direction by fifth and sixth die parts 931a and 931b of third die 931 to reduce a thickness of interconnecting section 33 to be smaller than thickness T. After pressing, handle 43 of wrench semifinished product 40 does not protrude out of and completely fills third mold part 93 without leaving any space in third mold part 93. Handle 43 of wrench semifinished product 40 has a first height H31 between upper and lower surfaces 46 and 48 adjacent first driving end 41 and a second height H32 between upper and lower surfaces 46 and 48 adjacent second driving end 42. First height H31 is smaller than height H1 of first driving end 41 and second height H32 smaller than height H2 of second driving end 42.

After pressing, waste sections 44 on first and second driving ends 41 and 42 of wrench semifinished product 40 and waste sections on an outer periphery of wrench semifinished product 40 are removed. As an example, first and second driving ends 41 and 42 of wrench semifinished product 40 are processed by a cutting tool to form combination wrench 40' including first driving end 41 with engaging opening 411 and second driving end 42 with engaging hole 421.

Combination wrenches 40' made by the method according to the teachings of the present invention are low in material costs and have less material waste sections, since the material plate 10 is almost fully utilized by the method according to the teachings of the present invention. Laborsome and time-consuming removal of the waste sections is not required. Further, wear of the shearing die for shearing wrench material pieces 20, 20b, 20c, 20d from material plate 10 is reduced due to the coincident arrangement of interconnecting inclined sides 24, 24b, and 24c, inclined sides 221, longer sides 231 and 231b, and shorter sides 211, 211b, and 211c of wrench material pieces 20, 20b, 20c, and 20d, increasing the service life of the shearing die. Furthermore, since carbon scale is not generated on wrench semifinished products 40, manual grinding for removing the carbon scale is not required, further reducing the manufacturing costs of combination wrenches 40'. Further, wrench semifinished products 40 with differing heights at different portions are formed due to plastic deformation of wrench blanks 30 in the pressing process, increasing the precision of combination wrenches 40' and avoiding generation of carbon scale. During the pressing process to form wrench semifinished product 40, plastic flow of metal wrench blank 30 causes change in thickness, obtaining excellent surface brightness and small tolerance while increasing the structural strength of combination wrench 40'.

It can be appreciated that wrench material piece 20 can be obtained or prepared by other suitable methods. Furthermore, combination wrenches 40' including two ends with shapes other than a box end and an open end can be manufactured by utilizing sealed mold 90 and dies 911, 921 and 931 of different shapes. It can be further appreciated that first and second ends 21 and 22, 21b and 22b, 21c and 22c, 21d and 22d of each wrench material piece 20, 20b, 20c, 20d can be directly pressed to form wrench semifinished product 40 without removing waste sections 25. All of the waste sections can be removed after pressing.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A method for manufacturing combination wrenches comprising:

preparing a material plate including first and second edges spaced in a width direction and top and bottom edges extending between the first and second edges, with the top and bottom edges spaced in a length direction perpendicular to the width direction, with the material plate further including upper and lower faces extending between the top and bottom edges and between the first and second edges, with the upper and lower faces defining a thickness therebetween in a thickness direction perpendicular to the width and length directions, with the material plate including a plurality of wrench material pieces arranged in the length direction, with each of the plurality of wrench material pieces including first and second ends spaced in the width direction and an interconnecting section interconnected between the first and second ends;

shearing each of the plurality of wrench material pieces from the material plate;

pressing each of the plurality of wrench material pieces in a sealed mold at a temperature without generating carbon scale to form a wrench semifinished product, with each of the wrench semifinished products including first and second driving ends formed from the first and second ends of one of the plurality of wrench material pieces, with each of the wrench semifinished products further including a handle interconnected between the first and second driving ends and formed from the interconnecting section of one of the plurality of wrench material pieces, with each of the wrench semifinished products further including upper and lower surfaces extending between the first and second driving ends and spaced in the thickness direction, with the first driving end of each of the wrench semifinished products having a height between the upper and lower surfaces and not larger than the thickness of the material plate, with the second driving end of each of the wrench semifinished products having a height between the upper and lower surfaces and larger than the thickness, with the handle of each of the wrench semifinished products having a first height between the upper and lower surfaces adjacent the first driving end, with the handle of each of the wrench semifinished products further having a second height between the upper and lower surfaces adjacent the second driving end, with the first height smaller than the height of the first driving end, with the second height smaller than the height of the second driving end; and processing the first and second driving ends of each of the wrench semifinished products to form a combination wrench having two ends with different shapes.

2. The method as claimed in claim 1, further comprising: removing a waste section from each of the first and second ends of each of the plurality of wrench material pieces before pressing each of the plurality of wrench material pieces.

3. The method as claimed in claim 2, with pressing each of the plurality of wrench material pieces including pressing each of the plurality of wrench material pieces at room temperature by cold-forging.

4. The method as claimed in claim 2, with pressing each of the plurality of wrench material pieces including heating each of the plurality of wrench material pieces and then pressing each of the plurality of wrench material pieces.

5. The method as claimed in claim 2, with processing the first and second driving ends of each of the wrench semifinished products including processing the first and second driving ends of each of the wrench semifinished products to form the combination wrench having a box end and an open end.

6. The method as claimed in claim 5, with pressing each of the plurality of wrench material pieces in the sealed mold including placing the first end of each of the plurality of wrench material pieces in a first mold part of the sealed mold, with the first mold part defining a first cavity having a first contour complimentary to the open end of the combination wrench, with the first end of the wrench material piece having a volume smaller than that of the first mold part, leaving a first space in the first mold part; and pressing the first end of the wrench material piece in the thickness direction to form the first driving end of the wrench semifinished product, with the first driving end of the wrench semifinished product not protruding out of and completely filling the first mold part without leaving any space in the first mold part.

7. The method as claimed in claim 6, with pressing each of the plurality of wrench material pieces in the sealed mold including placing the second end of each of the plurality of wrench material pieces in a second mold part of the sealed mold, with the second mold part defining a second cavity having a second contour complimentary to the box end of the combination wrench, with the second end of the wrench material piece having a volume smaller than that of the second mold part, leaving a second space in the second mold part; and pressing the second end of the wrench material piece in the thickness direction to form the second driving end of the wrench semifinished product, with the second driving end of the wrench semifinished product not protruding out of and completely filling the second mold part without leaving any space in the second mold part.

8. The method as claimed in claim 7, with pressing each of the plurality of wrench material pieces in the sealed mold including placing the interconnecting section of each of the plurality of wrench material pieces in a third mold part of the sealed mold, with the third mold part interconnected between the first and second mold parts, with the third mold part defining a third cavity having a third contour complimentary to the handle of the combination wrench, with the interconnecting section of the wrench material piece having a volume smaller than that of the third mold part, leaving a third space in the third mold part; and pressing the interconnecting section of the wrench material piece in the thickness direction to form the handle of the wrench semifinished product, with the handle of the wrench semifinished product not protruding out of and completely filling the third mold part without leaving any space in the third mold part.

9. The method as claimed in claim 8, with pressing each of the plurality of wrench material pieces in the sealed mold including simultaneously and respectively squeezing the first end, the second end, and the interconnecting section of the wrench material piece in the sealed mold by first, second, and third dies to form the wrench semifinished product.

10. The method as claimed in claim 9, with each of the plurality of wrench material pieces including first and second faces spaced in the thickness direction and respectively formed by a portion of the upper face and a portion of the lower face of the material plate, with squeezing the first end of the wrench material piece including squeezing a first intermediate portion of the first end of the wrench material piece in the thickness direction by the first die including first and second die parts, with the first intermediate portion of the first end of the wrench material piece including an outer edge having a portion spaced from a portion of an outer periphery of the first end of the wrench material piece, with another portion of the outer edge of the first intermediate portion coincident to another portion of the outer periphery of the first end of the wrench material piece, with the first and second die parts of the first die sandwiching and respectively squeezing the first and second faces at the first intermediate portion to reduce a thickness of the first intermediate portion to be smaller than the thickness and to form the first driving end of the wrench semifinished product having the height not larger than the thickness, with squeezing the second end of the wrench material piece including squeezing a second intermediate portion of the second end of the wrench material piece in the thickness direction by the second die including third and fourth die parts, with the second intermediate portion of the second end of the wrench material piece spaced from an outer periphery of the second end of the wrench material piece, with the third and fourth die parts of the second die sandwiching and respectively squeezing the first and second faces at the second intermediate portion to reduce a thickness of the second intermediate portion to be smaller than the thickness and to form the second driving end of the wrench semifinished product having the height larger than the thickness, with squeezing the interconnecting section including squeezing the interconnecting section of the wrench material piece in the thickness direction by the third die including fifth and sixth die parts, with the fifth and sixth die parts of the third die sandwiching and respectively squeezing the first and second faces of the wrench material piece at the interconnecting section to reduce a thickness of the interconnecting section to be smaller than the thickness and to form the handle of the wrench semifinished product having the first and second heights.

11. A method for manufacturing a combination wrench comprising:
preparing a wrench material piece, with the wrench material piece including first and second ends spaced in a first, width direction and an interconnecting section interconnected between the first and second ends, with the interconnecting section including first and second sides spaced in a second, length direction perpendicular to the width direction, with the wrench material piece having a thickness in a third, thickness direction perpendicular to the width and length directions;
pressing the wrench material piece in a sealed mold at a temperature without generating carbon scale to form a wrench semifinished product, with the wrench semifinished product including first and second driving ends formed from the first and second ends of the wrench material piece, with the wrench semifinished product further including a handle interconnected between the first and second driving ends and formed from the interconnecting section of the wrench material piece, with the wrench semifinished product further including upper and lower surfaces extending between the first and second driving ends and spaced in the thickness direction, with the first driving end of the wrench semifinished product having a height between the upper and lower surfaces and not larger than the thickness, with the second driving end of the semifinished product having a height between the upper and lower surfaces and larger than the thickness, with the handle of the wrench semifinished product having a first height between the upper and lower surfaces adjacent the first driving end, with the handle of the wrench semifinished product further having a second height between the upper and lower surfaces adjacent the second driving end, with the first height smaller than the height of the first driving end, with the second height smaller than the height of the second driving end; and
processing the first and second driving ends of the wrench semifinished product to form the combination wrench having two ends with different shapes.

12. The method as claimed in claim 11, further comprising: removing a waste section from each of the first and second ends of the wrench material piece before pressing the wrench material piece to form the wrench semifinished product.

13. The method as claimed in claim 12, with pressing the wrench material piece including pressing the wrench material piece at room temperature by cold-forging.

14. The method as claimed in claim 12, with pressing the wrench material piece including heating the wrench material piece and then pressing the wrench material piece.

15. The method as claimed in claim 12, with processing the first and second driving ends of the wrench semifinished product including processing the first and second driving ends of the wrench semifinished product to form the combination wrench having a box end and an open end.

16. The method as claimed in claim 15, with pressing the wrench material piece in the sealed mold including placing the first end of the wrench material piece in a first mold part of the sealed mold, with the first mold part defining a first cavity having a first contour complimentary to the open end of the combination wrench, with the first end of the wrench material piece having a volume smaller than that of the first mold part, leaving a first space in the first mold part; and pressing the first end of the wrench material piece in the thickness direction to form the first driving end of the semifinished product, with the first driving end of the wrench semifinished product not protruding beyond and completely filling the first mold part without leaving any space in the first mold part.

17. The method as claimed in claim 16, with pressing the wrench material piece in the sealed mold including placing the second end of the wrench material piece in a second mold part of the sealed mold, with the second mold part defining a second cavity having a second contour complimentary to the box end of the combination wrench, with the second end of the wrench material piece having a volume smaller than that of the second mold part, leaving a second space in the second mold part; and pressing the second end of the wrench material piece in the thickness direction to form the second driving end of the wrench semifinished product, with the second driving end of the semifinished product not protruding beyond and completely filling the second mold part without leaving any space in the second mold part.

18. The method as claimed in claim 17, with pressing the wrench material piece in the sealed mold including placing the interconnecting section of the wrench material piece in a third mold part of the sealed mold, with the third mold part interconnected between the first and second mold parts, with the third mold part defining a third cavity having a third contour complimentary to the handle of the combination wrench, with the interconnecting section of the wrench material piece having a volume smaller than that of the third mold part, leaving a third space in the third mold part; and pressing the interconnecting section of the wrench material piece in the thickness direction to form the handle of the wrench semifinished product, with the handle of the wrench semifinished product not protruding beyond and completely filling the third mold part without leaving any space in the third mold part.

19. The method as claimed in claim 18, with pressing the wrench material piece in the sealed mold including simultaneously and respectively squeezing the first end, the second end, and the interconnecting section of the wrench material piece in the sealed mold by first, second, and third dies to form the semifinished product.

20. The method as claimed in claim 19, with the wrench material piece including first and second faces spaced in the thickness direction, with squeezing the first end of the wrench material piece including squeezing a first intermediate portion of the first end of the wrench material piece in the thickness direction by the first die including first and second die parts, with the first intermediate portion of the first end of the wrench material piece including an outer edge having a portion spaced from a portion of an outer periphery of the first end of the wrench material piece, with another portion of the outer edge of the first intermediate portion coincident to another portion of the outer periphery of the first end of the wrench material piece, with the first and second die parts of the first die sandwiching and respectively squeezing the first and second faces at the first intermediate portion to reduce a thickness of the first intermediate portion to be smaller than the thickness and to form the first driving end of the wrench semifinished product having the height not larger than the thickness, with squeezing the second end of the wrench material piece including squeezing a second intermediate portion of the second end of the wrench material piece in the thickness direction by the second die including third and fourth die parts, with the second intermediate portion of the second end spaced from an outer periphery of the second end of the wrench material piece, with the third and fourth die parts of the second die sandwiching and respectively squeezing the first and second faces at the second intermediate portion to reduce a thickness of the second intermediate portion to be smaller than the thickness and to form the second driving end of the wrench semifinished product having the height larger than the thickness, with squeezing the interconnecting section of the wrench material piece including squeezing the interconnecting section of the wrench material piece in the thickness direction by the third die including fifth and sixth die parts, with the fifth and sixth die parts of the third die sandwiching and respectively squeezing the first and second faces of the wrench material piece at the interconnecting section to reduce a thickness of the interconnecting section to be smaller than the thickness and to form the handle of the wrench semifinished product having the first and second heights.

* * * * *